US010890230B2

(12) United States Patent
Tanaka et al.

(10) Patent No.: US 10,890,230 B2
(45) Date of Patent: Jan. 12, 2021

(54) BALANCE SHAFT STRUCTURE

(71) Applicant: HONDA MOTOR CO., LTD., Tokyo (JP)

(72) Inventors: Kazuma Tanaka, Wako (JP); Narumi Kato, Wako (JP); Nozomi Okada, Wako (JP); Junnosuke Ito, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 41 days.

(21) Appl. No.: 16/366,501

(22) Filed: Mar. 27, 2019

(65) Prior Publication Data
US 2019/0301565 A1 Oct. 3, 2019

(30) Foreign Application Priority Data

Mar. 29, 2018 (JP) .................................. 2018-065155

(51) Int. Cl.
F02B 75/06 (2006.01)
F16F 15/26 (2006.01)
F16F 15/28 (2006.01)

(52) U.S. Cl.
CPC .......... F16F 15/265 (2013.01); F16F 15/283 (2013.01)

(58) Field of Classification Search
CPC .......... F16H 55/18; F16H 57/12; F16H 55/14; Y10T 74/19898
USPC ..................................................... 123/192.2
See application file for complete search history.

(56) References Cited

U.S. PATENT DOCUMENTS

| 8,656,885 | B2* | 2/2014 | Negoro | F01M 11/0004 |
| | | | | 123/195 C |
| 2007/0215091 | A1* | 9/2007 | Ho | F01L 1/024 |
| | | | | 123/192.2 |
| 2009/0127057 | A1* | 5/2009 | Inomori | F16D 43/12 |
| | | | | 192/70.18 |
| 2010/0139431 | A1* | 6/2010 | Park | F16H 55/18 |
| | | | | 74/409 |

(Continued)

FOREIGN PATENT DOCUMENTS

EP 2010799 A1 1/2009
JP 2001-271883 A 10/2001
(Continued)

OTHER PUBLICATIONS

Office Action dated Jan. 7, 2020, issued in the corresponding Japanese Patent Application No. 2018-065155.
(Continued)

Primary Examiner — Long T Tran
Assistant Examiner — James J Kim
(74) Attorney, Agent, or Firm — Carrier Blackman & Associates, P.C.; William D. Blackman; Joseph P. Carrier

(57) ABSTRACT

A balance shaft structure includes a balance shaft including a balance weight, a driven gear to rotate the balance shaft by being engaged with a drive gear, a scissors mechanism, whose position in an axial direction is regulated, including a scissors gear to reduce backlash between the drive gear and the driven gear and an axially urging member to urge the scissors gear toward the driven gear in the axial direction, a first regulating portion to regulate an axially inner position of the scissors mechanism, and a second regulating portion fixed to the balance shaft on a side close to the shaft end part of the balance shaft beyond the first regulating portion and configured to regulate an axially outer position of the scissors mechanism.

19 Claims, 2 Drawing Sheets

(56) References Cited

U.S. PATENT DOCUMENTS

| | | | | |
|---|---|---|---|---|
| 2013/0145878 A1* | 6/2013 | Kim | ................... | C22C 33/0264 |
| | | | | 74/445 |
| 2013/0228029 A1* | 9/2013 | Murphy | ................. | F16H 55/18 |
| | | | | 74/443 |
| 2015/0128740 A1* | 5/2015 | Hayashi | ................. | F16H 55/18 |
| | | | | 74/440 |
| 2018/0328478 A1* | 11/2018 | Mori | ....................... | F16H 55/18 |

FOREIGN PATENT DOCUMENTS

| | | |
|---|---|---|
| JP | 2004-232825 A | 8/2004 |
| JP | 2010-007484 A | 1/2010 |
| JP | 4546604 B2 | 9/2010 |
| JP | 2013-024397 A | 2/2013 |
| JP | 2013-238260 A | 11/2013 |

OTHER PUBLICATIONS

Office Action dated Jul. 1, 2020 issued in the corresponding Indian Patent Application No. 201914010665.

\* cited by examiner

BALANCE SHAFT STRUCTURE

BACKGROUND

1. Technical Field

The present invention relates to a balance shaft structure.

2. Description of the Background

Traditionally, as disclosed, for example, in Patent Literature 1, there has been known a balance shaft structure that includes a balance shaft provided with a balance weight, a driven gear to rotate the balance shaft by being engaged with a drive gear, and a scissors mechanism, whose position in an axial direction is regulated, including a scissors gear (backlash gear) to reduce backlash between the drive gear and the driven gear and an axially urging member (disc spring) to urge the scissors gear toward the driven gear in the axial direction.

CITATION LIST

Patent Literature

Patent Literature 1: Japanese Patent Application Laid-open No. 2001-271883

BRIEF SUMMARY

According to the conventional balance shaft structure, the scissors mechanism is regulated in position in the axial direction as follows. First, three washers are abutted to corresponding end faces of three spacers and bolts are caused to pass through the spacers and washers with coil springs accommodated in corresponding positions. Then, the bolts are screwed into corresponding bolt holes formed at a flange with the above components inserted to corresponding elongated holes that are formed respectively at a gear and the scissors gear, so that the gear and the scissors gear are connected to the flange and a weight part and a non-weight part are integrated.

That is, to regulate the scissors mechanism in position in the axial direction with the conventional balance shaft structure, it is required to fasten three bolts while sandwiching three spacers and three washers, resulting in complicated operations.

An object of the present invention is to provide a balance shaft structure capable of easily regulating a scissors mechanism in position in an axial direction.

To achieve the abovementioned object, the present invention provides a balance shaft structure including
a balance shaft including a balance weight;
a driven gear configured to rotate the balance shaft by being engaged with a drive gear;
a scissors mechanism including
a scissors gear configured to reduce backlash between the drive gear and the driven gear, and
an axially urging member configured to urge the scissors gear toward the driven gear in an axial direction;
a first regulating portion arranged on the balance shaft and configured to regulate an axially inner position of the scissors mechanism; and
a second regulating portion concentrically fixed to the balance shaft on a side close to a shaft end part of the balance shaft beyond the first regulating portion and configured to regulate an axially outer position of the scissors mechanism.

In the present specification, "the side close to the shaft end part of the balance shaft beyond the first regulating portion" includes the position at the shaft end part of the balance shaft.

According to the balance shaft structure, the axially inner position of the scissors mechanism is regulated by the first regulating portion arranged on the balance shaft on the inner side from the shaft end part of the balance shaft with respect to the axial direction and the axially outer position of the scissors mechanism is regulated by the second regulating portion fixed to the balance shaft on the side close to the shaft end part beyond the first regulating portion.

That is, according to the balance shaft structure, being performed by the pair of regulating portions (i.e., first and second regulating portions) arranged on the balance shaft, regulating positions of the scissors mechanism in the axial direction can be easily performed.

Further, since the scissors mechanism is arranged on the balance shaft and the axially urging member is urged by the second regulating portion fixed concentrically with the balance shaft, urging force can be evenly exerted.

In the balance shaft structure, both the balance weight and the driven gear may be arranged on the balance shaft, the axially inner position or the axially outer position of the scissors mechanism may be regulated by the first regulating portion or the second regulating portion via the balance weight, and the axially inner position or the axially outer position may be regulated by the first regulating portion or the second regulating portion via the driven gear.

According to the above configuration, since positions of the scissors mechanism in the axial direction can be regulated using the balance weight and the driven gear arranged on the balance shaft, upsizing in length in the axial direction can be suppressed.

In the balance shaft structure, the axially urging member may be a disc spring, the balance shaft may penetrate the disc spring, the balance weight may have an abutting face perpendicular to the balance shaft, and a face of the disc spring may abut to the abutting face.

According to the above configuration, owing to using the balance weight on the balance shaft, urging force of the disc spring can be generated without increasing the number of components.

In the balance shaft structure, the balance weight may include a concave portion, at an opposed face to the scissors gear, concaved from the abutting face in the axial direction as being apart from the scissors gear.

According to the above configuration, the concave portion can serve as an oil basin for supplying oil to the disc spring.

In the balance shaft structure, the second regulating portion may be formed by a bolt that is fastened and fixed coaxially to the shaft end part of the balance shaft, and a distance between the first regulating portion and the second regulating portion may be defined by fastening the bolt to the shaft end part of the balance shaft.

According to the above configuration, accuracy of positions of the scissors mechanism in the axial direction can be enhanced.

In the balance shaft structure, the second regulating portion may be formed by an axially inner face of a bearing member arranged at an outer circumference of the shaft end part of the balance shaft.

According to the above configuration, since the second regulating portion is formed by the bearing member arranged on the balance shaft, upsizing in length in the axial direction can be suppressed.

In the balance shaft structure, the first regulating portion may be formed by a flange portion integrally formed with the balance shaft on the inner side from the shaft end part of the balance shaft.

According to the above configuration, the first regulating portion can be formed easily and accurately.

DETAILED DESCRIPTION

In the following, description will be provided on embodiments of a balance shaft structure of the present invention with reference to the drawings. In each drawing, the same reference sign is given to the same or corresponding component.

Figure 1:
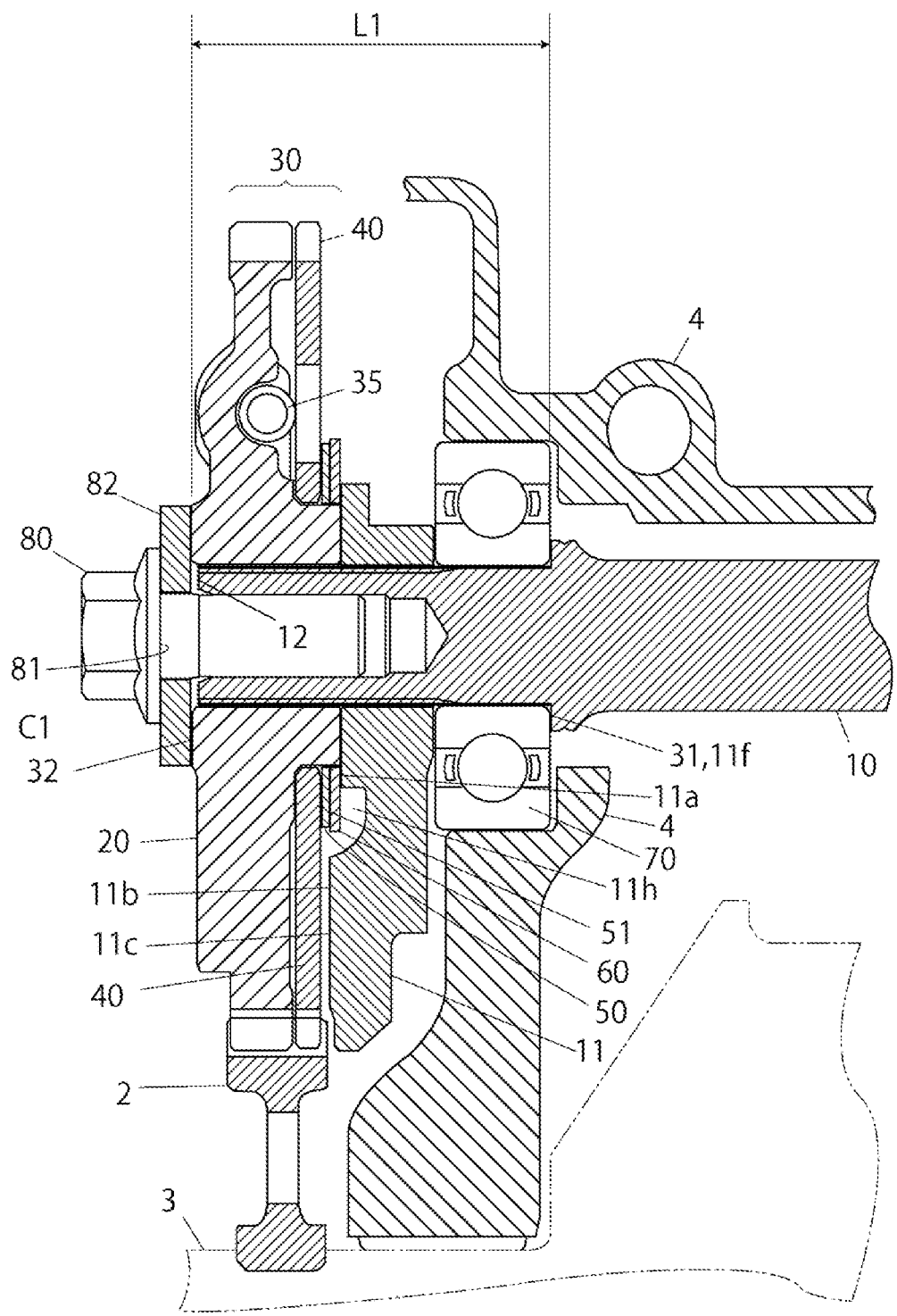
FIG. 1 is a sectional view illustrating an embodiment of a balance shaft structure of the present invention.

As illustrated in FIG. 1, a balance shaft structure of an embodiment includes a balance shaft 10 provided with a balance weight 11, a driven gear 20 to rotate the balance shaft 10 by being engaged with a drive gear 2, and a scissors mechanism 30 to reduce backlash between the drive gear 2 and the driven gear 20.

The scissors mechanism 30 is a mechanism, whose position in an axial direction is regulated, including a scissors gear 40 and an axially urging member 50 to urge the scissors gear 40 toward the driven gear 20 in the axial direction.

The balance shaft structure of the present embodiment includes a first regulating portion 31 that regulates an axially inner position of the scissors mechanism 30, the first regulating portion 31 being arranged on the balance shaft 10 on the inner side (on the right side in FIG. 1) from a shaft end part 12 of the balance shaft 10 with respect to the axial direction (the lateral direction in FIG. 1), and a second regulating portion 32 that regulates an axially outer position of the scissors mechanism 30, the second regulating portion 32 being fixed to the balance shaft 10 on the side close to the shaft end part 12 beyond the first regulating portion 31.

The second regulating portion 32 regulates the axially outer position of the scissors mechanism 30 by being fixed concentrically with the balance shaft 10 on the side close to the shaft end part 12 beyond the first regulating portion 31 of the balance shaft 10.

Here, as described above, in the present specification, "the side close to the shaft end part 12 beyond the first regulating portion 31 of the balance shaft 10" includes the position at the shaft end part 12 of the balance shaft 10.

According to the balance shaft structure, the axially inner position of the scissors mechanism 30 is regulated by the first regulating portion 31 arranged on the balance shaft 10 on the inner side from the shaft end part 12 of the balance shaft 10 with respect to the axial direction and the axially outer position of the scissors mechanism 30 is regulated by the second regulating portion 32 fixed to the balance shaft 10 on the side close to the shaft end part 12 beyond the first regulating portion 31.

That is, according to the balance shaft structure, being performed by the pair of regulating portions (i.e., first and second regulating portions 31, 32) arranged on the balance shaft 10, regulating positions of the scissors mechanism 30 in the axial direction can be easily performed.

Further, since the scissors mechanism 30 is arranged on the balance shaft 10 and the axially urging member 50 is urged by the second regulating portion 32 fixed concentrically with the balance shaft 10, urging force can be evenly exerted.

The above is described below in detail.

In the related art described above, the three bolts are arranged on a concentric circle with the balance shaft. However, since fastening force of the bolts is mainly exerted on portions around the bolts or on a triangle connecting the bolts as viewing in the axial direction, the axially urging member (disc spring) cannot be assumed to be urged concentrically and evenly.

In contrast, according to the present embodiment, since the axially urging member 50 is urged concentrically by the second regulating portion 32 fixed concentrically with the balance shaft 10, urging force can be evenly exerted.

Both the balance weight 11 and the driven gear 20 are arranged on the balance shaft 10. Regarding positions of the scissors mechanism 30 in the axial direction, the axially inner position is regulated by the first regulating portion 31 via the balance weight 11 and the axially outer position is regulated by the second regulating portion 32 via the driven gear 20.

According to the above configuration, since positions of the scissors mechanism 30 in the axial direction can be regulated using the balance weight 11 and the driven gear 20 arranged on the balance shaft 10, upsizing in length in the axial direction can be suppressed.

In the configuration illustrated in FIG. 1, the axially inner position is regulated by the first regulating portion 31 via the balance weight 11 and the axially outer position is regulated by the second regulating portion 32 via the driven gear 20. In a case that positional relation between the balance weight 11 and the driven gear 20 is reversed (line-symmetric) with respect to the axial direction, the axially inner position is regulated by the first regulating portion 31 via the driven gear 20 and the axially outer position is regulated by the second regulating portion 32 via the balance weight 11. With this configuration, the similar effect can be obtained as well. That is, since positions of the scissors mechanism 30 in the axial direction can be regulated using the balance weight 11 and the driven gear 20 arranged on the balance shaft 10, it is possible to obtain the effect to suppress upsizing in length in the axial direction.

Further, in the configuration illustrated in FIG. 1, the axially inner position is regulated by the first regulating portion 31 via a bearing member 70 and the balance weight 11. However, the bearing member 70 is not necessarily required and the balance weight 11 may be abutted directly to the first regulating portion 31.

That is, the first regulating portion 31 may regulate the axially inner position directly or indirectly via an intermediate member.

The axially urging member 50 is a disc spring and the balance shaft 10 penetrates the disc spring 50. The balance weight 11 has an abutting face 11a perpendicular to the balance shaft 10. A face 51 of the disc spring 50 abuts to the abutting face 11a.

According to the above configuration, owing to using the balance weight 11 on the balance shaft 10, urging force of the disc spring 50 can be generated without increasing the number of components.

In the configuration illustrated in FIG. 1, the face 51 of the disc spring 50 abuts to the abutting face 11a via a washer 60. However, it is also possible that the face 51 directly abuts to the abutting face 11a without the washer 60 being an intermediate member interposed therebetween.

The balance weight 11 includes a concave portion 11h, at an opposed face 11c to the scissors gear 40, concaved from the abutting face 11a in the axial direction as being apart from the scissors gear 40.

In other words, the balance weight 11 includes a swell portion 11b swelling in the axial direction toward the scissors gear 40 and the concave portion 11h is formed between the swell portion 11b and the abutting face 11a.

With this configuration, the concave portion 11h can serve as an oil basin for supplying oil to the disc spring 50.

The second regulating portion 32 is formed by a washer 82 interposed between the shaft end part 12 of the balance shaft 10 and a bolt 80 that is fastened and fixed coaxially to the shaft end part 12. A distance L1 between the first regulating portion 31 and the second regulating portion 32 is defined by fastening the bolt 80 to the shaft end part 12 of the balance shaft 10.

With this configuration, accuracy of positions of the scissors mechanism 30 in the axial direction can be enhanced.

In the configuration illustrated in FIG. 1, the second regulating portion 32 is formed by the washer 82 interposed between the bolt 80 and the shaft end part 12. However, the second regulating portion 32 may be formed directly as a seating face 81 of the bolt 80.

That is, the second regulating portion 32 may be formed, directly or indirectly via an intermediate member, by the bolt 80 that is fastened and fixed coaxially to the shaft end part 12 of the balance shaft 10.

In the configuration illustrated in FIG. 1, a clearance C1 is formed between the shaft end part 12 and the washer 82 for ensuring fastening with the bolt 80.

The first regulating portion 31 is formed by a flange portion 11f integrally formed with the balance shaft 10 on the inner side from the shaft end part 12 of the balance shaft 10.

With this configuration, the first regulating portion 31 can be formed easily and accurately.

Figure 2:
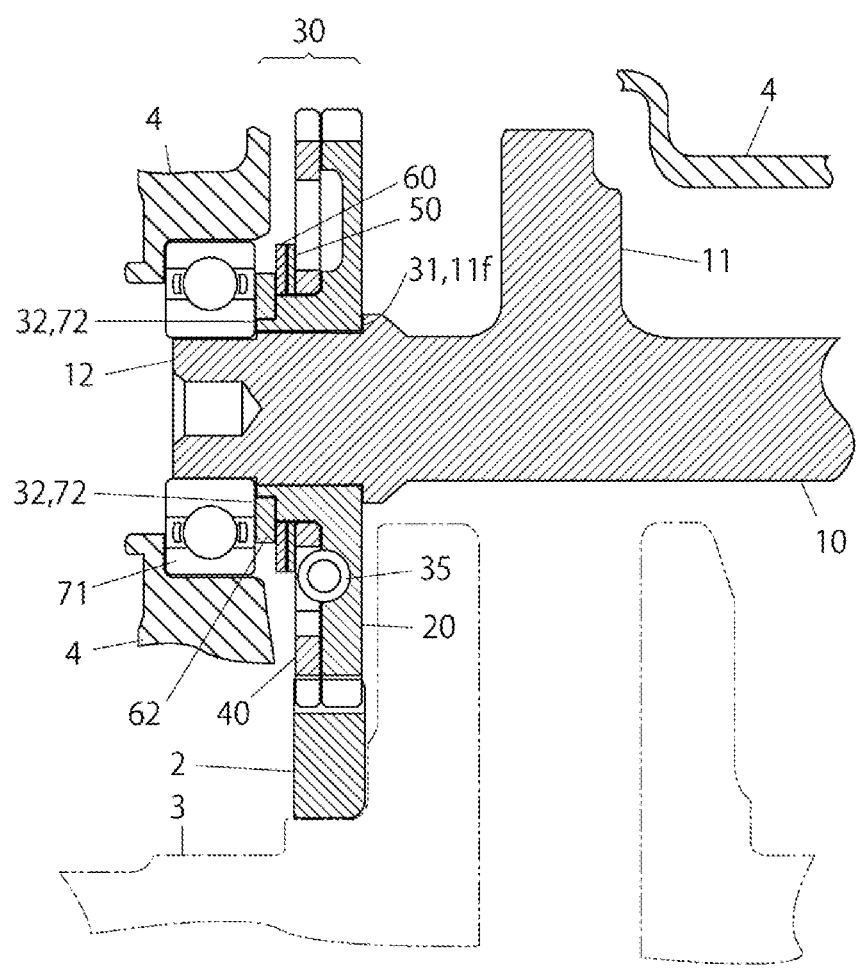
FIG. 2 is a sectional view illustrating another embodiment.

FIG. 2 is a view illustrating another embodiment.

In this embodiment, the second regulating portion 32 is formed by an axially inner face 72 of a bearing member 71 arranged at an outer circumference of the shaft end part 12 of the balance shaft 10.

With this configuration, since the second regulating portion 32 is formed by the bearing member 71 arranged on the balance shaft 10, upsizing in length in the axial direction can be suppressed.

In the present embodiment, the driven gear 20, the scissors gear 40, the disc spring 50 as the axially urging member, the washer 60, and a spacer 62 are arranged sequentially from the first regulating portion 31 toward the second regulating portion 32. Accordingly, the disc spring 50 urges the scissors gear 40 toward the driven gear 20.

The balance weight 11 is arranged on the inner side from the first regulating portion 31.

A crank shaft 3 of an engine and a crank case 4 that rotatably supports the crank shaft 3 and the balance shaft 10 are illustrated in FIGS. 1 and 2. The drive gear 2 is arranged on the crank shaft 3 and is rotated along with the crank shaft 3.

Similarly to the related art, a coil spring 35, which is an urging member, to urge the driven gear 20 and the scissors gear 40 relatively in a circumferential direction is arranged between the gears 20, 40 to reduce backlash.

Not limited to the abovementioned embodiments, the present invention may be appropriately modified within the scope of the spirit of the present invention.

REFERENCE SIGNS LIST

1: Balance shaft structure
2: Drive gear
10: Balance shaft
11: Balance weight
11a: Abutting face
11f: Flange portion
11h: Concave portion
12: Shaft end part
20: Driven gear
30: Scissors mechanism
31: First regulating portion
32: Second regulating portion
40: Scissors gear
50: Axially urging member (Disc spring)
71: Bearing member
72: Axially inner face
80: Bolt

What is claimed is:

1. A balance shaft structure, comprising:
   a balance shaft including a balance weight;
   a driven gear configured to rotate the balance shaft by being engaged with a drive gear;
   a scissors mechanism including a scissors gear configured to reduce backlash between the drive gear and the driven gear, and an axially urging member configured to urge the scissors gear toward the driven gear in an axial direction;
   a first regulating portion arranged on the balance shaft and configured to regulate an axially inner position of the scissors mechanism; and
   a second regulating portion concentrically fixed to the balance shaft on a side close to a shaft end part of the balance shaft beyond the first regulating portion and configured to regulate an axially outer position of the scissors mechanism,
   wherein the balance weight has an abutting face perpendicular to the balance shaft,
   and wherein a face of the axially urging member abuttingly contacts the abutting face of the balance weight.

2. The balance shaft structure according to claim 1, wherein
   both the balance weight and the driven gear are arranged on the balance shaft,
   the axially inner position or the axially outer position of the scissors mechanism is regulated by the first regulating portion or the second regulating portion via the balance weight, and
   the axially inner position or the axially outer position is regulated by the first regulating portion or the second regulating portion via the driven gear.

3. The balance shaft structure according to claim 2, wherein the axially urging member is a disc spring, and the balance shaft penetrates the disc spring.

4. The balance shaft structure according to claim 3, wherein the balance weight includes a concave portion, at an opposed face to the scissors gear, concaved from the abutting face in the axial direction as being apart from the scissors gear.

5. A balance shaft structure, comprising:
   a balance shaft including a balance weight;
   a driven gear configured to rotate the balance shaft by being engaged with a drive gear;
   a scissors mechanism including a scissors gear configured to reduce backlash between the drive gear and the driven gear, and an axially urging member configured to urge the scissors gear toward the driven gear in an axial direction;

a first regulating portion arranged on the balance shaft and configured to regulate an axially inner position of the scissors mechanism; and a second regulating portion concentrically fixed to the balance shaft on a side close to a shaft end part of the balance shaft beyond the first regulating portion and configured to regulate an axially outer position of the scissors mechanism, wherein the second regulating portion is formed by a bolt that is fastened and fixed coaxially to the shaft end part of the balance shaft, and a distance between the first regulating portion and the second regulating portion is defined by fastening the bolt to the shaft end part of the balance shaft.

6. The balance shaft structure according to claim 1, wherein the second regulating portion is formed by an axially inner face of a bearing member arranged at an outer circumference of the shaft end part of the balance shaft.

7. The balance shaft structure according to claim 1, wherein the first regulating portion is formed by a flange portion integrally formed with the balance shaft on the inner side from the shaft end part of the balance shaft.

8. The balance shaft structure according to claim 2,
wherein the second regulating portion is formed by a bolt that is fastened and fixed coaxially to the shaft end part of the balance shaft, and a distance between the first regulating portion and the second regulating portion is defined by fastening the bolt to the shaft end part of the balance shaft.

9. The balance shaft structure according to claim 3,
wherein the second regulating portion is formed by a bolt that is fastened and fixed coaxially to the shaft end part of the balance shaft, and a distance between the first regulating portion and the second regulating portion is defined by fastening the bolt to the shaft end part of the balance shaft.

10. The balance shaft structure according to claim 4,
wherein the second regulating portion is formed by a bolt that is fastened and fixed coaxially to the shaft end part of the balance shaft, and a distance between the first regulating portion and the second regulating portion is defined by fastening the bolt to the shaft end part of the balance shaft.

11. The balance shaft structure according to claim 2, wherein the second regulating portion is formed by an axially inner face of a bearing member arranged at an outer circumference of the shaft end part of the balance shaft.

12. The balance shaft structure according to claim 3, wherein the second regulating portion is formed by an axially inner face of a bearing member arranged at an outer circumference of the shaft end part of the balance shaft.

13. The balance shaft structure according to claim 4, wherein the second regulating portion is formed by an axially inner face of a bearing member arranged at an outer circumference of the shaft end part of the balance shaft.

14. The balance shaft structure according to claim 5, wherein the second regulating portion is formed by an axially inner face of a bearing member arranged at an outer circumference of the shaft end part of the balance shaft.

15. The balance shaft structure according to claim 2, wherein the first regulating portion is formed by a flange portion integrally formed with the balance shaft on the inner side from the shaft end part of the balance shaft.

16. The balance shaft structure according to claim 3, wherein the first regulating portion is formed by a flange portion integrally formed with the balance shaft on the inner side from the shaft end part of the balance shaft.

17. The balance shaft structure according to claim 4, wherein the first regulating portion is formed by a flange portion integrally formed with the balance shaft on the inner side from the shaft end part of the balance shaft.

18. The balance shaft structure according to claim 5, wherein the first regulating portion is formed by a flange portion integrally formed with the balance shaft on the inner side from the shaft end part of the balance shaft.

19. The balance shaft structure according to claim 6, wherein the first regulating portion is formed by a flange portion integrally formed with the balance shaft on the inner side from the shaft end part of the balance shaft.

* * * * *